United States Patent [19]

Sugiyama et al.

[11] Patent Number: 4,506,593
[45] Date of Patent: Mar. 26, 1985

[54] PISTON HEAD STRUCTURE

[75] Inventors: Masahiko Sugiyama; Kenichi Nishio, both of Toyota, Japan

[73] Assignee: Toyota Jidosha Kabushiki Kaisha, Toyota, Japan

[21] Appl. No.: 460,022

[22] Filed: Jan. 21, 1983

Related U.S. Application Data

[63] Continuation of Ser. No. 212,420, Dec. 3, 1980, abandoned.

[30] Foreign Application Priority Data

Dec. 19, 1979 [JP] Japan .................. 54-164076
Apr. 9, 1980 [JP] Japan .................. 55-46474

[51] Int. Cl.³ .......................................... F16J 1/04
[52] U.S. Cl. .................................... 92/212; 92/224
[58] Field of Search ............... 92/212, 213, 215, 222, 92/224, 248; 123/193 P; 164/DIG. 8

[56] References Cited

U.S. PATENT DOCUMENTS

| | | | |
|---|---|---|---|
| 1,490,849 | 4/1924 | Philip | 92/224 |
| 1,556,634 | 10/1925 | Ryalls | 164/DIG. 8 |
| 1,700,604 | 1/1929 | Wagener | 92/213 |
| 2,323,074 | 6/1943 | Neugebauer et al. | 92/212 |
| 3,402,644 | 9/1968 | Geiger et al. | 92/222 |
| 3,408,995 | 11/1968 | Johnson | 123/668 |
| 4,245,611 | 1/1981 | Mitchell et al. | 123/193 P |

FOREIGN PATENT DOCUMENTS

| | | | |
|---|---|---|---|
| 708361 | 6/1941 | Fed. Rep. of Germany | 123/668 |
| 578316 | 6/1924 | France | 123/669 |
| 562275 | 3/1957 | Italy | 92/224 |
| 54-107710 | 7/1979 | Japan | |
| 1527791 | 10/1978 | United Kingdom | 123/193 P |

Primary Examiner—Richard E. Schafer
Assistant Examiner—Richard Klein
Attorney, Agent, or Firm—Kenyon & Kenyon

[57] ABSTRACT

A piston head structure in which a piston head made of a ceramic is firmly secured to the top portion of a metallic piston body through the medium of a metallic ring fitted to the lower part of the piston head. In assembling, the ceramic piston head to which the metallic ring is fitted beforehand is secured to the top portion of the piston body by a shrink fit or, alternatively, the assembly of the ceramic piston head and the metallic ring is inserted to the metallic material of the piston body during casting of the latter, and the cast piston body is then subjected to necessary mechanical processing. In this structure, the separation of the piston head from the piston body is prevented due to the close fit of the ceramic piston head and the metallic ring to the metallic piston body. Such a fit prevents separation even when the piston body is expanded due to the heat generated during operation of the engine. In addition, the ceramic piston head is protected by the metallic ring against any external force which acts to cause a cracking or breakage of the ceramic piston head, during the production of the piston.

9 Claims, 7 Drawing Figures 4,506,593

PISTON HEAD STRUCTURE

This application is a continuation of application Ser. No. 212,420, filed Dec. 3, 1980, now abandoned.

BACKGROUND OF THE INVENTION

The present invention relates generally to ceramic piston structures, and more particularly to a ceramic piston head which is secured to the top portion of a piston in a manner which prevents cracking the ceramic piston head and its separation from the piston.

Recently, a piston has been developed which improves the combustion efficiency of diesel engines or the like, and has a piston head made of a ceramic material. The ceramic piston head prevents the scattering of heat from the combustion chamber, and thereby suppresses the production of unburnt gas.

Various structures have been proposed for firmly securing a ceramic piston head to the top portion of a piston. A typical example of such known structures employs an adhesive by which the piston head is adhered to the piston body. This structure, however, is impractical because the adhesive is degraded by the heat generated by the engine and allows, in the worst case, the separation of the ceramic piston head from the piston body.

Another known structure is provided with screw threads formed in the ceramic piston head and the piston body so that these two members are firmly secured to each other by a screwing engagement. This structure is also impractical because it necessitates a complicated and troublesome machining for forming the screw threads and may allow the piston and ceramic head to loosen from each other at the screwing portion of the piston assembly.

Still another more practical structure employs a shrink fit between the ceramic piston head and the piston body. This known structure, however, may be subject to separation and dropping of the piston body from the ceramic piston head when the engine is operated at a high temperature. Such separation is the result of a large difference between the respective coefficients of thermal expansion of the metal constituting the piston body and the ceramic of the piston head. However, if the shrink fit is made by producing a large shrinkage so as to prevent the dropping of the piston head, the ceramic may crack as a result of an excessive tightening force.

It has been further proposed that the piston head might be secured to the piston during casting of the piston body. This proposal, however, has the disadvantage that the ceramic is likely to be broken when the metal of the piston body solidifies. To avoid this, it has been attempted to place a glass fiber, or the like, as a buffer between the ceramic and the metal. However, such a structure tends to loosen the fit between the ceramic piston head and the piston body because the glass fiber tends to be crushed by the engine vibration during operation.

To overcome this problem, a proposal has been made to use a metallic ring 3 interposed between the metallic piston body 2 and the ceramic piston head 1, as shown in the prior art arrangement of FIG. 1. In this manner, the tightening force which is increased as the molten metal of the piston body solidifies is absorbed and relaxed by the metallic ring 3.

This known structure is effective in preventing the cracking of the ceramic piston head. However, the metallic ring 3 cannot provide a secure fit intermediate of the piston body 2 and the ceramic piston head 1 because the known metallic ring 3 has smooth inner and outer peripheral surfaces. Therefore, a slight gap is formed between the metallic ring 3 and the metallic piston body 2 or between the metallic ring 3 and the ceramic piston head 1 due to the difference between the coefficients of thermal expansion of the metal of the ring 3 and the metal of the piston body 2, or due to deterioration of stiffness of the metal, so that the piston head 1 may be dangerously separated from the piston body after an extended period of operation.

For these reasons, the prior art has not produced a practicable piston having a ceramic piston head.

It is, therefore, an object of the invention to enhance and improve the fit of a metallic ring between a ceramic piston head and a metallic piston body so as to provide a reliable piston structure which avoids the problems of loosening and rattling, even after a long use, and thereby overcomes the prior art problem of dropping of the ceramic piston head.

SUMMARY OF THE INVENTION

To this end, according to the invention, there is provided a piston head structure comprising a ceramic piston head which is provided on its outer peripheral surface with an annular recess. A metallic ring is provided which has, on its inner peripheral surface, an annular projection corresponding to the annular recess of the ceramic piston head. The metallic ring is provided on its outer peripheral surface with a retaining means, which may be a selectable combination of a groove, projection and recess, and a step with a greater diameter at the part thereof adjacent to the piston body, or a taper. The ceramic piston head and the metallic ring are fitted to each other and secured to a piston body by insertion into the molten metal during casting of the piston body, or by a shrink fit.

DETAILED DESCRIPTION OF THE PREFERRED EMBODIMENTS

Hereinafter, preferred embodiments of the invention will be described with reference to the accompanying drawings.

Figure 1:
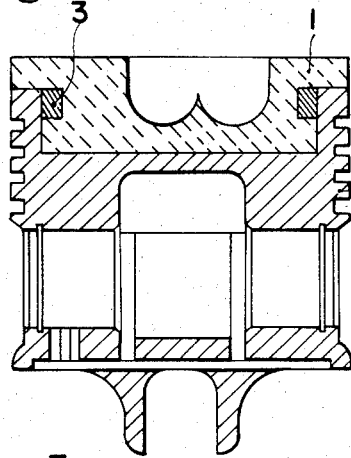
FIG. 1 is an illustration of a prior art piston and ceramic head arrangement.
Figure 2:
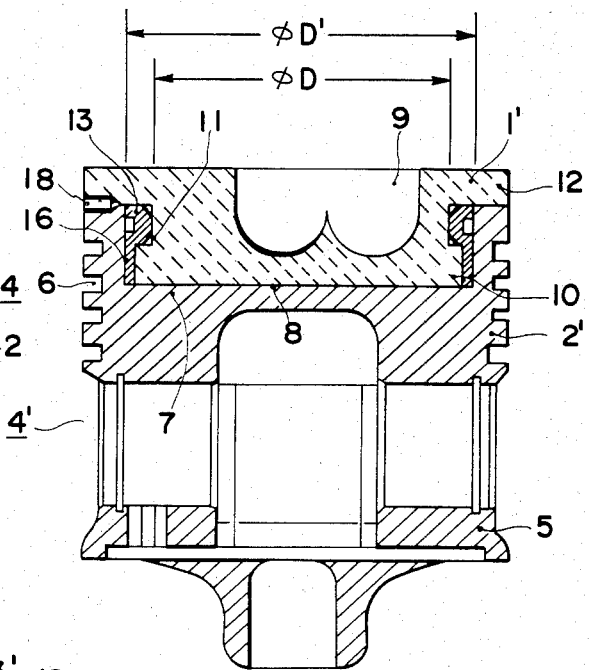
FIG. 2 is an illustration of a first embodiment of the invention.
Figure 3:
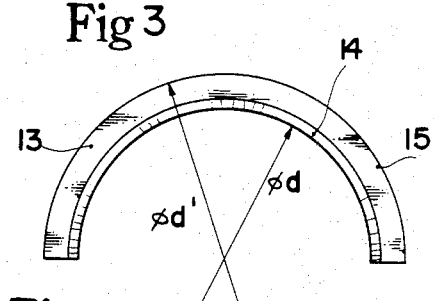
FIG. 3 is a plan view of a ring incorporated in the structure shown in FIG. 2.
Figure 4:
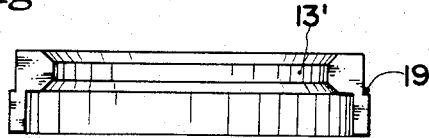
FIG. 4 is a side elevational view of the structure shown in FIG. 2.

FIGS. 2 to 4 in combination show a piston having a piston head structure constructed in accordance with a first embodiment of the invention, suitable for use in diesel engines. The piston generally designated by a reference numeral 4' denotes a piston body 2' made of an aluminum alloy which has a lower skirt portion 5 and a predetermined number of peripheral ring grooves 6.

The top portion 7 of the piston body 2' has a central recess 8.

The piston head 1' is made of a ceramic material such as silicon nitride, silicon carbide, alumina, glass ceramic and so forth and is provided at its upper central portion with a combustion recess 9. The piston head 1' is provided also at its lower portion with a lateral, peripheral projection 10 which forms an annular groove 11. In addition, the piston head 1' is provided at its upper portion with a flange 12. The piston head 1' thus constructed is received by the central recess 8 of the top portion of the piston body.

A reference numeral 13 designates a ring made of a metallic material such as invar having a small coefficient of thermal expansion. As will be seen from FIGS. 3 and 4, the ring 13 is composed of a pair of semi-circular half portions of the same size. Each half portion of the ring 13 has a projection 14 directed radially inward from the inner peripheral surface thereof to fit the annular groove 11 of the piston head 1', while the outer peripheral surface 15 fits the inner peripheral surface of the recess 8 of the piston body 2'. Thus, ring 13 fits between the flange 12 of the piston head 1' and the piston body 2'. A reference numeral 17 designates a circumferential groove formed in the outer peripheral surface 15 of the ring 13. Also, a reference numeral 18 denotes a lock pin which is inserted between the piston body 2' and the piston head 1' at a part of the joint between these two members to prevent unnecessary rotation of these two members relative to each other.

When the assembling of the piston 4' is made by a shrink fit, the dimensional relationship between the ring 13 and the piston head 1' is so selected that the inside diameter d of the ring 13 formed by the pair of ring halves contacting at their both ends is somewhat smaller than the diameter D of the annular groove 11 in the piston head 1'. The silicon nitride material of the piston head 1' and the invar material of the ring 13 exhibit substantially equal coefficients of thermal expansion of approximately $3.2 \times 10^{-6}/°C$. In this manner, a sufficient margin of shrink fit is preserved between the piston head 1' and the ring 13 irrespective of whether the engine is at the normal or room temperature, or at a high operating temperature.

Also, the outside diameter d' of the outer peripheral surface 15 of the ring 13 is selected to be about the same as diameter D' of the recess of the piston body 2', at the normal temperature. Since the aluminum alloy material of the piston body 2' exhibits a coefficient of thermal expansion which is about $24 \times 10^{-6}/°C$, it is possible to firmly secure the piston head 1' and the ring 13 to the piston body 2' by a shrink fit by heating the latter. It is necessary that the outer peripheral surface 15 of the ring 13 and the inner peripheral surface of the recess of the piston ring be finished precisely to produce the above-mentioned diameters d' and D' which provide a sufficient margin of the shrink fit even when the piston is heated to a temperature higher than the high temperature of 250° C. or so which is attained during operation of the engine.

Consequently, a large clamping force is applied to the ring 13 at the normal temperature after the shrink fit. This force, however, is counteracted by the rigidity of the piston ring 13 so that the inside diameter d of the ring and, hence, the clamping force exerted by the ring 13 on the piston head 1' do not exhibit substantial increase. Therefore, the cracking of the ceramic material of the piston head 1' is avoided.

In the operation of a diesel engine having pistons with the piston head structure described heretofore, the piston body 2', ring 13 and the piston head 1' fit, of course, at a constant shrink-fitting margin, when the piston is maintained at the normal temperature. Even when the engine temperature is raised to, for example, 250° C., a sufficient shrink-fitting margin is preserved between the ring 13 and the piston head 1' which are made of materials having substantially equal coefficients of thermal expansion. In addition, since the ring 13 and the piston body 2' are designed and sized to maintain the sufficient margin of shrink fit as stated before, the tightness of the fit is maintained also in this state to prevent the piston head 1' from dropping.

As the engine temperature is raised, there is a slight decrease of the shrink-fitting margin thereby causing a tendency toward rotation of the piston head 1' relative to the piston body 2'. Such a rotation, however, is avoided by lock pin 18.

The ceramic piston head 1' described hereinabove exhibits a superior heat insulation characteristic and thereby affords a higher combustion efficiency of the engine.

Figure 5:
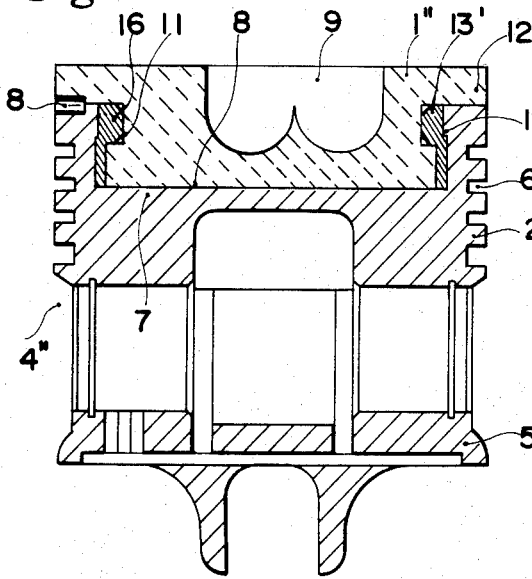
FIG. 5 is an illustration of another embodiment of the invention.
Figure 6:
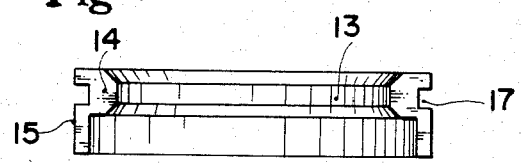
FIG. 6 is a plan view of a ring incorporated in the structure shown in FIG. 5.

FIGS. 5 and 6 show another embodiment of the invention in which the piston head 1" and the ring 13' are secured to the piston body 2" by insertion during the casting of the piston 4". Ring 13' has a step line 19 extending in the circumferential direction and is fitted beforehand around piston head 1". This assembly is inserted into the aluminum alloy in the molten state during casting of the piston body 2". Thereafter, a necessary machining is effected on the peripheral portion and other portion of the piston body 2" to complete the piston 4".

Step line 19 prevents ring 13' and, hence, the piston head 1", from separating from the piston body 2".

As noted, the ring 13' is beforehand fitted to the piston head 1". This assembly is then placed in a mold for casting the piston body, and the mold is filled with the aluminum alloy so that the assembly becomes integral with the cast piston body 2". The blank material of the piston thus formed is then subjected to necessary mechanical processing for machining at the outer peripheral surface and so forth to become the piston 4".

In the piston 4" thus fabricated, the clamping force exerted on the piston head 1" by the shrinkage of the aluminum alloy during casting is borne by the rigidity of the metallic ring 13' so that the cracking or breakage of the ceramic piston head 1" is completely eliminated.

An actual running test was conducted with a diesel engine incorporating pistons constructed in accordance with the invention. The test result showed that, in spite of a slight gap formed between the piston body 2" and the metallic ring 13' due to the difference in the coefficients of thermal expansion, the dropping of the piston head 1" from the piston body 2" is completely avoided due to the engagement between the metallic ring 13' and the piston head 1", as well as the presence of the step line 19 formed on the outer peripheral surface of the metallic ring 13'.

Figure 7:
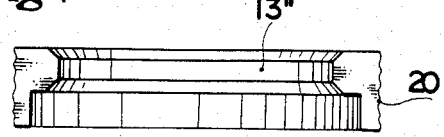
FIG. 7 is a side elevational view of another ring.

A piston was fabricated substantially in the same manner as the foregoing embodiments but using a metallic ring 13" which is provided, as shown in FIG. 7, with a plurality of annular protrusions and recesses 20 formed in its outer peripheral surface. It was confirmed that the cracking of the piston head and dropping of the same are completely avoided also in this case.

Although the invention has been described through its preferred forms, the described embodiments are not exclusive and various changes and modifications may be imparted thereto. For instance, an equivalent effect is obtained even when a steel having a sufficient rigidity and a coefficient of thermal expansion intermediate between the silicon nitride and aluminum alloy is used as the material of the ring.

As has been described, according to the invention, it is possible to put into practical use the piston having a ceramic piston head which is firmly secured to the top portion of the piston body. Such a piston with a ceramic piston head can provide an improved heat insulating effect at the piston head so that the combustion efficiency is increased considerably in diesel engines or the like incorporating this piston. In addition, a higher heat preserving effect is attained to reduce the generation of unburnt gas to contribute to the prevention of pollution over the conventional internal combustion engines.

In addition, since the piston head is closely fitted to the recess formed in the top portion of the piston head, cracking or breakage of the piston head during the production of the piston is avoided.

Furthermore, the influence of the coefficient of thermal expansion between the ceramic piston head and the piston body made of aluminum alloy is absorbed and relaxed by the presence of the metallic ring so as to prevent separation of the piston head from the piston body during operation of the engine.

We claim:

1. A piston head structure for an engine wherein a ceramic piston head is firmly secured to the top portion of a piston body, characterized in that a metallic ring, which is formed of two semicircular portions and has a radially inward projection projected from the inner peripheral surface thereof, is radially inwardly fitted at an upper portion thereof to an annular groove formed at a lower part of said ceramic piston head and that said ceramic piston head fits tightly in a radially outward direction within an annular wall in a recess formed in the top portion of said piston body, all radial communication between said lower part of said ceramic piston head and said annular wall in said recess formed in the top portion of said piston body being achieved, exclusively through the medium of said metallic ring which is engaged with said annular wall in said recess in the top portion of said piston body to prevent the ceramic piston head from separating from the piston body when the engine is operated, a lowermost surface of said ceramic piston head engages in direct contact with a bottom wall in said recess, and an upper part of said ceramic piston head extends radially outward over said metallic ring and approximately coextensively with said piston structure which surrounds said annular wall of said recess.

2. A piston head structure for an engine wherein a ceramic piston head is firmly secured to the top portion of a piston body, characterized in that a metallic ring, which is formed of two semicircular portions and has a step formed on the outer peripheral surface thereof, is radially inwardly fitted at an upper portion thereof to an annular groove formed at a lower part of said ceramic piston head and that said ceramic piston head fits tightly in a radially outward direction within an annular wall in a recess formed in the top portion of said piston body, all radial communication between said lower part of said ceramic piston head and said annular wall in said recess formed in the top portion of said piston body being achieved, exclusively through the medium of said metallic ring which is engaged with said annular wall in said recess in the top portion of said piston body to prevent the ceramic piston head from separating from the piston body when the engine is operated, a lowermost surface of said ceramic piston head engages in direct contact with a bottom wall in said recess, and an upper part of said ceramic piston head extends radially outward over said metallic ring and approximately coextensively with said piston structure which surrounds said annular wall of said recess.

3. A piston head arrangement of the type which is provided with a piston body having an upper portion with a recess therein, the recess forming a lower inner wall and an annular inner wall in the upper portion of the piston body, the arrangement further comprising a ceramic piston head secured to the upper portion of the piston body, the ceramic piston head having a top portion which extends radially outward over the annular inner wall of the recess in the upper portion of the piston body, a middle portion disposed within the recess along a predetermined axial depth of the recess, and a lowermost portion having a bottom surface for directly contacting the lower inner wall of the recess, and metallic ring means arranged within the recess to be radially intermediate of the piston body and the ceramic piston head, said metallic ring means being formed of two semicircular portions and having a projection extending radially inward at an upper portion thereof for engaging an annular groove formed on the middle portion of the ceramic piston head, said metallic ring means radially outwardly engaging the annular inner wall of the recess with a tight radial fit therebetween and throughout the predetermined axial depth of the recess.

4. The piston head arrangement of claim 3 wherein the ceramic piston head and said metallic ring means are secured within the recess in the upper portion of the piston body by a shrink fit.

5. The piston head arrangement of claim 3 wherein said metallic ring means has an outside diameter which is greater than an inside diameter of the annular wall in the recess prior to assembly.

6. The piston head arrangement of claim 3 wherein the piston head and said metallic ring means are secured within the recess during the casting of the piston body.

7. The piston head arrangement of claim 3 wherein a radially inward step is formed on an outer peripheral surface of said metallic ring means for engaging an upper, radially inwardly projecting portion of the piston body.

8. The piston head arrangement of claim 3 wherein said metallic ring means is provided with a groove on a radially outer surface thereof.

9. The piston head arrangement of claim 3 wherein said metallic ring means is provided with an outer surface having a plurality of convexities and concavities formed thereon.

* * * * *